United States Patent [19]
Janin et al.

[11] Patent Number: 5,628,859
[45] Date of Patent: May 13, 1997

[54] METHOD OF HEATING BY EMISSION OF ELECTROMAGNETIC RADIATION, ESPECIALLY INFRARED RADIATION

[75] Inventors: Jean-Louis Janin, Fillinges; Michel Gorguet, Lucinges, both of France

[73] Assignee: Mecasonic S.A., Annemasse Cedex, France

[21] Appl. No.: 253,343

[22] Filed: Jun. 3, 1994

[30] Foreign Application Priority Data

Jun. 17, 1993 [FR] France .................. 93 07333

[51] Int. Cl.$^6$ .................................. B32B 31/00
[52] U.S. Cl. ................. 156/273.3; 156/272.2; 156/322; 156/380.9
[58] Field of Search ............. 156/272.2, 273.3, 156/380.9, 379.6, 379.8, 322, 308.2

[56] References Cited

U.S. PATENT DOCUMENTS

| | | | |
|---|---|---|---|
| 2,705,523 | 4/1955 | Hasselquist. | |
| 3,131,623 | 5/1964 | Seefluth. | |
| 3,472,721 | 10/1969 | Abramson et al.. | |
| 3,694,289 | 9/1972 | Piazze. | |
| 3,804,691 | 4/1974 | Trivedi | 156/275.1 |
| 3,837,961 | 9/1974 | Vouillemin | 156/272.2 |
| 3,956,053 | 5/1976 | Staats | 156/272.2 |
| 5,035,045 | 7/1991 | Bowen et al. | 156/273.3 X |
| 5,073,219 | 12/1991 | McArdle et al. | 156/272.6 X |
| 5,286,327 | 2/1994 | Swartz | 156/273.3 |

FOREIGN PATENT DOCUMENTS

| | | | |
|---|---|---|---|
| 402910 | 12/1990 | European Pat. Off. | 156/380.9 |
| 1319307 | 1/1963 | France | 156/272.2 |
| 144656 | 10/1980 | German Dem. Rep. | 156/272.2 |
| 2520217 | 11/1972 | Germany | 156/308.9 |
| 2145870 | 3/1973 | Germany. | |
| 60-184829 | 2/1986 | Japan. | |
| 1-229616 | 12/1989 | Japan. | |
| WO89/03758 | 5/1989 | WIPO. | |
| WO90/00970 | 2/1990 | WIPO. | |

OTHER PUBLICATIONS

Heinze, M., "Entwicklungen in der Schweiβtechnologie", Kunststoffe, vol. 82, No. 12, Dec. 1992.

Potente, H., and Heil, M., "Hochtemperaturbeständige Kunststoffe mit Infrarotstrahlern schweiβen", Kunststoffe, vol. 82, No. 8, Aug. 1992.

*Primary Examiner*—David A. Simmons
*Assistant Examiner*—Paul M. Rivard
*Attorney, Agent, or Firm*—Pollock, Vande Sande & Priddy

[57] ABSTRACT

Method of heating by emission of electromagnetic radiation, wherein at least one emitting source is arranged extending in the form of a resistive element matching as close as possible the geometry formed by the joint lines of the thermoplastic components to be joined together with a reflecting zone conforming likewise to the profile of the resistive element, then an energy source, such as, especially, an electric current, is caused to pass inside the said emitting source so as to cause, by the Joule effect and by focusing the released radiation onto the reflective surfaces, possibly coated with a metal film, a surface layer of material at the interface of the said components to melt, and then the radiating source is set back in a position which does not interfere with the joining of the components.

4 Claims, 3 Drawing Sheets

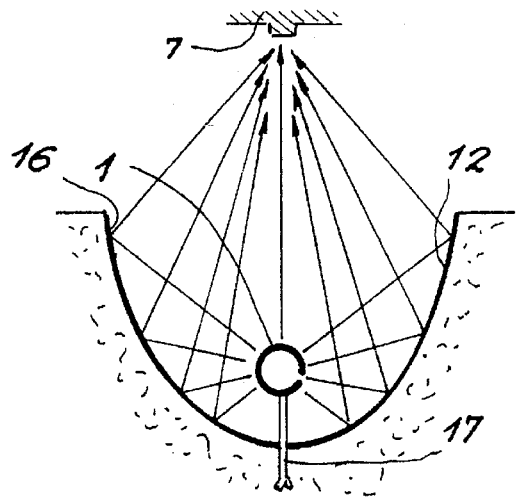
FIG. 4
FIG. 5
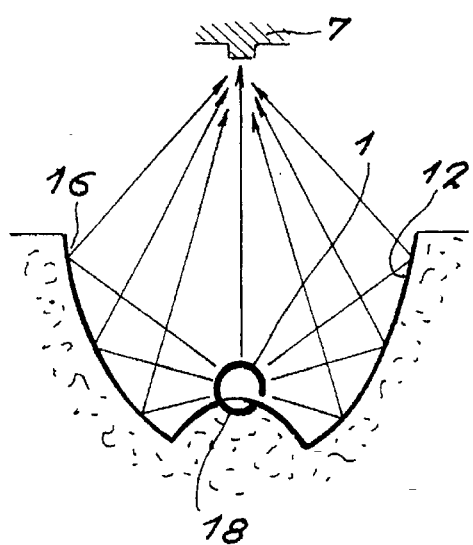
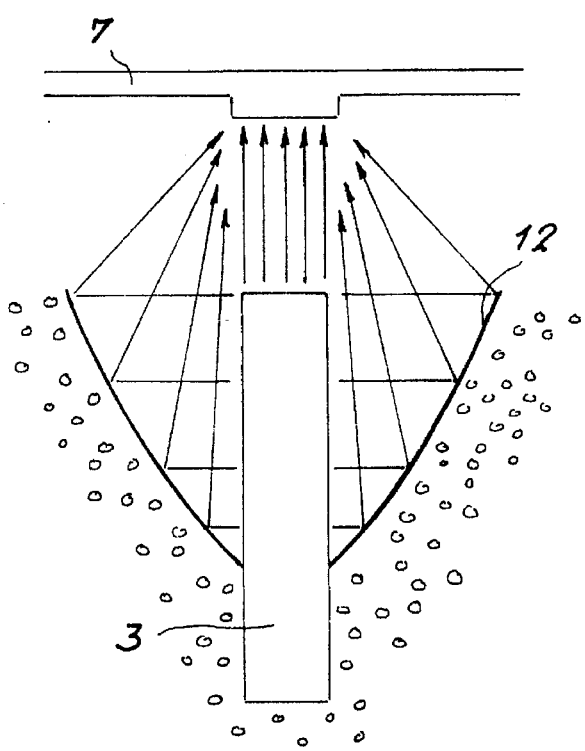
FIG. 6

METHOD OF HEATING BY EMISSION OF ELECTROMAGNETIC RADIATION, ESPECIALLY INFRARED RADIATION

FIELD OF THE INVENTION

The present invention relates to a method of welding by electromagnetic radiation, with a view to enabling components made of plastics, especially those from equipment manufacturers in the motor-vehicle industry, to be joined together. More particularly, it aims to provide a heater which, by means of its modes of actions without contact with the plastic component or components, causes a surface layer of material to melt before they are brought close together.

BACKGROUND OF THE INVENTION

Known welding methods employ technologies based on a heated mirror, the melting of a thickness of material is caused by bringing a metal element raised to a high temperature into contact with the joint area of the various components; this solution has the major drawback of requiring, on the part of the user, frequent cleaning of the heating surfaces; the reason for this is that residues of material agglutinate on the edges, creating, on the one hand, an insulating additional thickness deleterious to heat transfer and, on the other hand, a skin of softened material which generates a non-homogeneous weld bead.

Methods of heating without contact are also known, employed in installations such as, especially, systems using the blowing of hot air through a nozzle; nevertheless, this method of heating requires conducting the heater as close as possible to the joint area, which involves very difficult slow movements to be reproduced by the manipulator apparatus, hence poor control of the thickness of the softened bead.

For laboratory applications, methods of heating without contact, using infrared radiation, also predominate, but this heating beam is guided according to a sweeping movement in a straight line with respect to the surfaces, and, when the component has complex profiles, a plurality of sources are used which have the tendency to radiate over the entire component rather than simply focusing the heating beam onto the joint line or the joint plane.

All the previous solutions cannot be transferred for components which have tortuous profiles, such as, especially, indented, skewed or embossed profiles, and which are mass produced, and therefore involve very short machine times and as short as possible a maintenance of the production apparatus. In addition, since the components to be joined together generally have narrow junction lines, the existing methods of heating by infrared lamp involve numerous deformations in the proximity of the joints, as well as build-up of heat within the hollow components because of a surface treatment.

BRIEF DESCRIPTION OF THE DRAWING

The present invention is proposed for overcoming these drawbacks, by seeking a method of heating without contact, which is rapid by its mode of action, requiring no sweeping of the electromagnetic radiation with respect to the joint plane of the components, requiring no mirror opposed to the source so as to orient the radiation towards a surface hidden from the source, and which is adaptable and conformable to the most complex component geometries. Furthermore, it aims to produce a contactless heating element for very narrow lines and to do so for any excursion in three-dimensional space.

For this purpose, the present invention aims to provide a method of heating by emission of electromagnetic radiation, characterized in that at least one emitting source is arranged extending in the form of a resistive element matching as closely as possible the geometry formed by the joint lines of the thermoplastic components to be joined together with a reflecting zone conforming likewise to the profile of the resistive element, then an energy source, such as, especially, an electric current is caused to pass inside the said emitting source so as to cause, by the Joule effect and by focusing the released radiation onto the reflective surfaces, possibly coated with a metal film, a surface layer of material at the interface of the said components to melt, and then the radiating source is set back in a position which does not interfere with the joining of the components.

Other characteristics and advantages of the present invention will emerge from the description given herein below, with reference to the appended drawings which illustrate an exemplary embodiment, devoid of any limiting character, thereof.

BRIEF DESCRIPTION OF THE FIGURES

Figure 1:
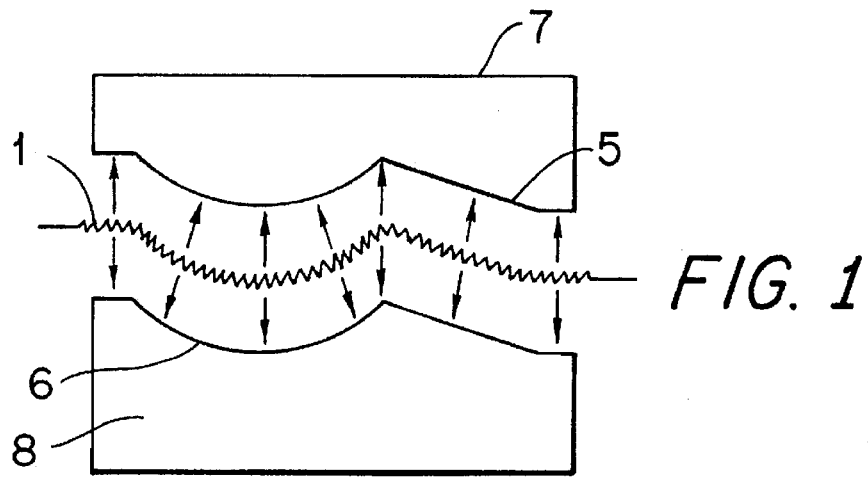
Figure 2:
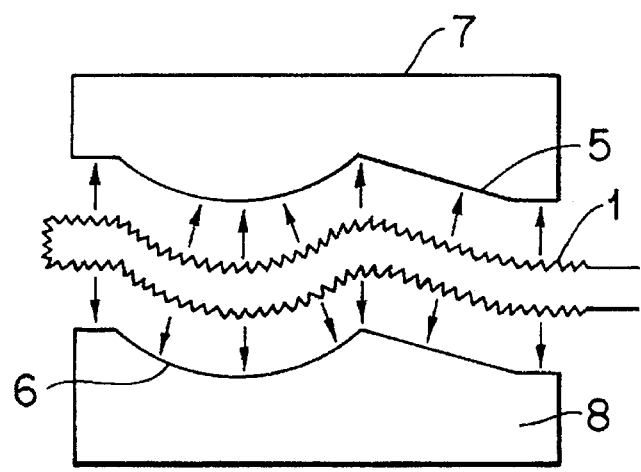
Figure 3:
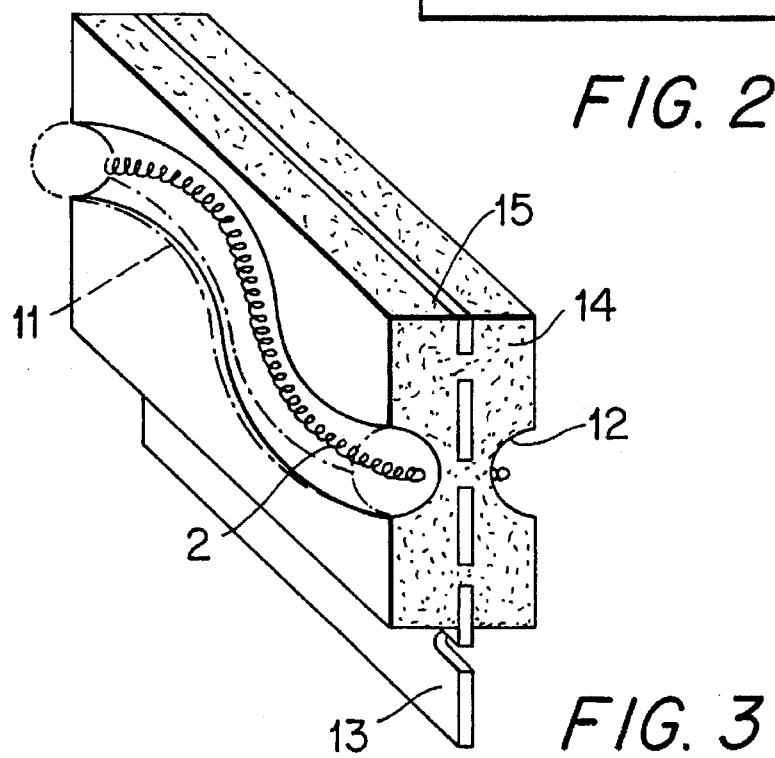
Figure 7:
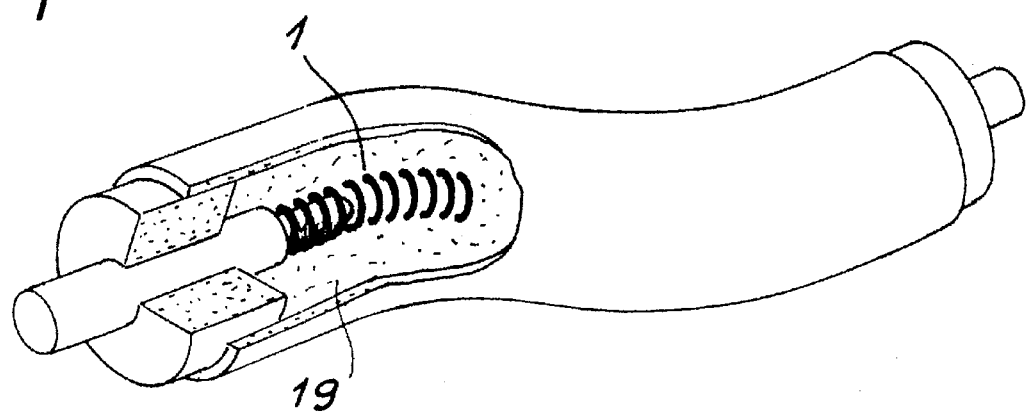
Figure 8:
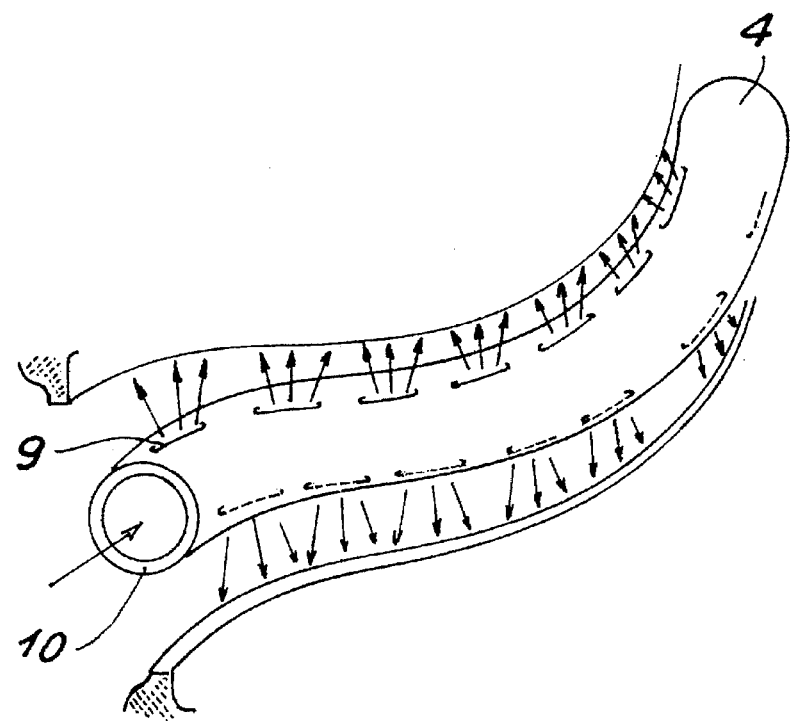

FIG. 1 is an embodiment of the method comprising a single emitting source;

FIG. 2 is an embodiment of the method comprising a so-called double emitting source;

FIG. 3 is a perspective view of a double emitting source;

FIG. 4 is a sectional view in front elevation, of a reflector fitted with an emitting source fastened by means of a foot;

FIG. 5 is a sectional view, in front elevation, of a reflector fitted with an emitting source fastened by means of partial embedding;

FIG. 6 is a sectional view, in front elevation, of an emitting source shaped in the form of a strip which may likewise be partially embedded;

FIG. 7 is a perspective view of an emitting source sheathed by a thermal conductor;

FIG. 8 is a perspective view of a tube provided with openings representing the source directly or sheathing it as a thermal diffuser.

DETAILED DESCRIPTION OF THE INVENTION

According to a preferred embodiment of an installation for employing the method of heating by electromagnetic emission, it comprises at least one radiating or emitting source 1 made in a material having a high strength capability and alternatively being in the form of a wire 2, a strip 3 or a tube 4, but possessing, irrespective of its embodiment, malleability properties so as to be conformed, by plastic deformation, such as, especially, by bending or winding in turns, to the complex geometry of the joint planes 5, 6 of the thermoplastic components 7, 8 to be joined together.

The emitting source, according to various ways of obtaining it, may possibly be left in the open air or be inserted into a tube 4. This tube closely follows, in the same way, all the convolutions and surface irregularities of the joint lines; furthermore, it may be sealed with respect to the outside environment and, in this case, the emitting source is immersed in an atmosphere devoid of or filled with gas (halogenated gas, rare gas, inert gas, etc.), or it allows, by means of a plurality of mini-buses produced by openings 9 made on lines opposite its volume in the case of a single source or of a single line in the case of a so-called double source, flow and directional blowing of hot gas, thereby causing convective movements which will combine, if required, with the radiative transfer.

In order to enable the radiation to be focused onto the useful surfaces and to enable external areas devoid of a joint bead not to suffer deterioration by softening, the emitting source is provided with a reflecting surface 12, such as, especially, an elliptical reflector or a convex mirror of the same type as the standard reflectors of infrared lamps, but in a manner adapted to the tortuous lines.

The efficiency of this method is essentially linked to the conformation and the relative position of the heater as regards the joint lines of the thermoplastic components. In order to reproduce its three-dimensional geometry as faithfully as possible, a cord or rod 11 (shown as the dashed lines in FIG. 3) made of flexible material, especially of the silicone-based elastomeric type, which conforms exactly to the outline of the joint lines. This rod 11, which will be removed consequently, foreshadows, in negative, the reflecting part 12 of the radiating source. The thermoplastic components provided, in their respective joint plane, with the said cord are arranged on the production machine or on a machining template; the two components are moved close together in a similar manner to an imaginary welding operation; when the components are virtually in contact, there is interposed between them and opposite a plane parallel to the cord 11, a rigid core 13, especially made in a metallic material serving as a reinforcement and skeleton to a plurality of refractory fiber and binder layers 14, 15 which imprison, after solidification of their faces not bonded to the core, the elastomeric cords 11. The sandwich thus formed withstands both significant mechanical and thermal shocks, and the central part enables the plurality of emitting sources 1 to be fixed in the hollow zones which remain after removing the said cords 11. Prior to the operations of fastening the radiating sources 1, it is possible to increase the reflecting power of these hollow zones by depositing, by vaporization, a thin metal film 16 having a high reflection coefficient, such as, especially, a metal alloy based on nickel, silver, copper. However, this alloy should possess very low thermal conductivity properties but have an excellent reflection coefficient and as high a melting point as possible. By way of example, an alloy of nickel and copper, commonly called "ARCAP" may be mentioned, the characteristics of which are as follows:

silver colour melting point: 1250° C.

70% optical reflection coefficient thermal conductivity: 23 W/m°C.

not corroded by any gaseous emanation.

A plurality of radiating sources 1 are positioned as close as possible to the focus of the reflecting zones 12, 16 thus produced, these radiating sources being fixed on each side of the sandwich by feet 17 or moving along, in a semi-embedded manner, in the refractory layer. The said source is in the form of a filament 2 or a strip 3, of circular or rectangular cross-section, these being made of a metal offering a very high resistance to the passage of the current, which therefore induces strong heating by the Joule effect.

According to another embodiment of the emitting source 1, it is also possible to machine out a series of machined features in a material, especially one based on a polymer resin possessing high hardness and heat-withstanding characteristics. The various phases of the machining are employed using a machine, possibly numerically controlled, which therefore makes it possible to control the cutting tool, such as, especially, a milling cutter, the cutting edges of which generate the desired profile of the reflecting zone 12 of the said emitting source 1 as a function of the CAD data of the components 7, 8 to be joined together.

The impression thus obtained forms a mould, intended to be filled with an alloy whose melting point lies within the range 50°–200° C.; the bismuth alloy (melting point 137° C.) may be mentioned, for example. After solidification, a nickel-based film 16 of small thickness (0.5 mm) is sprayed onto the free surface of the impression. This film 16 has asperities or rugosities for better clinging of the refractory material which will be added subsequently. A slot is machined out from the solidified alloy only in the emission zones, for installing a resistive strip 3 or wire 2.

Given the continuity of the emitting source and the partial discontinuity of the emitting zone defined by the components to be joined together, the lengths outside the working zone will be completely embedded within the refractory material added subsequently, which implies a major change in section so as to guarantee a lowering of the temperature of the wire or strip in the zones outside the reflector 12. These variations in section will be produced either by decreasing, by machining, the resistive element, or by increasing, by adding material by conventional welding under a rare gas.

From here on, it is advisable, on the one hand, to fasten the emitting source to the impression and, on the other hand, to enable it to be integrated into the production machine, by means of a covering or integration into a layer 14, 15 of refractory material whose service limit is at least 1400° C. The final operation consists in placing the solidified sandwich in an environment whose temperature is slightly greater than the melting point of the alloy (in our case 150° C.). The casting of metal allows a smooth reflective surface 12, conforming to the desired profile of the emitting source 1, to appear.

According to the required applications, that is to say depending on the quantity of energy which is to be radiated per unit length, the said filament is wound as a spiral, coiled up or folded into a concertina in the case of a strip. The electrical conductor is, especially, chosen from filaments based on tungsten, nickel, chromium, iron, aluminium, such as, for example, a resistive wire known by the term "KANTHAL AF" (Fe Ni Cr), of 1 mm diameter and coiled up on a 5 mm diameter with a 2.5 mm pitch. The electrical power applied to this conductor and converted, by the Joule effect, into electromagnetic waves in, especially, the infrared spectrum is, in a known manner, delivered by static-relay-based or thyristor-type power systems.

According to another embodiment of this radiating source, it is included in a tube 4 based on quartz and silica, or it is sheathed by a material 19 having a high thermal conductivity, such as, especially, magnesia.

Whatever the embodiment, electrical conductor in free air, conductor placed inside a tube, possibly pierced, or sheathed conductor, these closely follow the three-dimensional geometry of the joint lines perfectly and they are positioned as close as possible to the foci of the elliptical reflecting zones so as to focus the incident rays exclusively towards the joint zones.

The said conductors form a single source radiating over a solid angle of 360° onto a plurality of joint lines belonging to two separate components, or a double source separated by an absorbent wall, each diffusing in a solid angle of approximately 180° onto the respective joint lines of each thermoplastic component.

The method of heating by infrared emission, such as has just been described in of several ways of implementation, allows rapid movements and rates of the production apparatus, given the low masses of the emitting sources and their low inertia, both mechanical and thermal; moreover, the very precise focusing of the radiation ensures virtually instantaneous melting of the joint lines, and this is so without addition of external material. Furthermore, this way of melting without contact requires no production stoppage for cleaning the heating elements.

Of course, it remains the case that the present invention is not limited to the illustrative embodiments described and represented herein above, but that it encompasses all variants thereof, especially for applications for the welding of plastics in the toy, domestic-electrical-appliance and aeronautical fields.

We claim:

1. A method of joining non-sheet thermoplastic parts having joint lines of non-planar complex profile, comprising the steps:

locating a resistive element to form a three-dimensional profile in proximate conforming relation to the joint lines;

forming a conforming three-dimensional channel of concave surface in spaced proximity along the length of the element;

coating the concave conforming surface with a reflective material;

providing the element with current to generate radiation reflected from the reflective material toward at least one of the joint lines;

subjecting the joint line to the radiation to cause its melting;

removing the element from the channel;

fusing the parts together along the melted joint lines.

2. The method set forth in claim 1 further wherein cross-section variations are formed along the length of the element for decreasing the temperature produced thereat.

3. A method of joining non-sheet therrmoplastic parts having joint lines of non-planar complex profile, comprising the steps:

locating a resistive element in proximate conforming relation to the joint lines;

forming a conforming channel of concave surface in spaced proximity along the length of the element;

coating the concave conforming surface with a reflective material;

providing the element with current to generate radiation reflected from the reflective material toward at least one of the joint lines;

subjecting the joint line to the radiation to cause its melting;

removing the element from the channel;

fusing the parts together along the melted joint lines;

wherein the joint line profile is copied to form a channel, and further comprising the steps:

machining a polymer resin to obtain an impression whose profile is substantially identical to that of the joint lines;

filling the impression with an alloy having a melting point within the range 50°–200°;

depositing a thin nickel based film onto a free surface of the impression after solidification of the alloy;

machining a plurality of slots in the alloy to form emission zones;

positioning the element along the length of the impression;

rigidifying the element by filling the impression with refractory material;

placing the resulting assembly in an environment having a temperature slightly greater than the melting point of the alloy.

4. A method of joining non-sheet thermoplastic parts having joint lines of non-planar complex profile, comprising the steps:

locating a resistive element in proximate conforming relation to the joint lines;

forming a conforming channel of concave surface in spaced proximity along the length of the element;

coating the concave conforming surface with a reflective material;

providing the element with current to generate radiation reflected from the reflective material toward at least one of the joint lines;

subjecting the joint line to the radiation to cause its melting;

removing the element from the channel;

fusing the parts together along the melted joint lines;

wherein the joint line profile is copied to form a channel, and further comprising the steps:

shaping an elastomeric flexible cord in conformance with the geometry of the joint line;

embedding the shaped cord in a bed of refractory and binder material;

backing the embedded cord with a planar reinforcement;

solidifying the resulting assembly;

removing the cord;

replacing the cord with the element.

* * * * *